United States Patent
Malm et al.

(10) Patent No.: US 8,568,845 B2
(45) Date of Patent: *Oct. 29, 2013

(54) HETEROPHASIC POLYMER COMPOSITION OF HIGH STIFFNESS

(75) Inventors: Bo Malm, Espoo (FI); Franz Ruemer, St. Georgen/Gusen (AT); Andreas Wolf, Vienna (AT); Tua Sundholm, Göteborg (SE)

(73) Assignee: Borealis AG, Vienna (AT)

( * ) Notice: Subject to any disclaimer, the term of this patent is extended or adjusted under 35 U.S.C. 154(b) by 143 days.

This patent is subject to a terminal disclaimer.

(21) Appl. No.: 12/737,463

(22) PCT Filed: Jul. 7, 2009

(86) PCT No.: PCT/EP2009/058603
§ 371 (c)(1),
(2), (4) Date: Feb. 28, 2011

(87) PCT Pub. No.: WO2010/006961
PCT Pub. Date: Jan. 21, 2010

(65) Prior Publication Data
US 2011/0151161 A1     Jun. 23, 2011

(30) Foreign Application Priority Data
Jul. 16, 2008   (EP) .................................... 08160542

(51) Int. Cl.
| B32B 1/00 | (2006.01) |
| B32B 1/08 | (2006.01) |
| C08F 255/02 | (2006.01) |
| C08F 2/34 | (2006.01) |
| C08F 4/649 | (2006.01) |

(52) U.S. Cl.
USPC ..... 428/36.9; 428/35.7; 428/36.4; 428/36.92; 525/240; 525/270; 525/322; 526/65

(58) Field of Classification Search
USPC ......... 428/35.7, 36.4, 36.6, 36.7, 36.9, 36.91, 428/36.92; 525/240, 270, 322; 526/65
See application file for complete search history.

(56) References Cited

U.S. PATENT DOCUMENTS 8,043,712 B2 * 10/2011 Kawai et al. .................. 428/515

FOREIGN PATENT DOCUMENTS

| EP | 0 591 224 | 2/1998 |
| EP | 0887357 A1 | 12/1998 |
| EP | 0942020 A1 | 9/1999 |
| EP | 1 026 184 | 8/2000 |
| EP | 1 028 985 | 4/2003 |
| EP | 1 632 529 | 3/2006 |
| WO | WO 99/24479 | 5/1999 |
| WO | WO 00/68315 | 11/2000 |
| WO | WO 02/072693 | 9/2002 |

* cited by examiner

Primary Examiner — Walter B Aughenbaugh
(74) Attorney, Agent, or Firm — Warn Patners, P.C.

(57) ABSTRACT

The present invention relates to a heterophasic polymer composition which comprises (i) a matrix comprising a propylene homopolymer and/or a propylene copolymer having an amount of comonomer units of less than 1.0 wt %, and (ii) an elastomeric polypropylene which is dispersed within the matrix and comprises comonomer units derived from ethylene and/or a C4 to C12 alpha-olefin; and wherein the heterophasic polymer composition has an amorphous fraction AM in an amount of 2.0 to 7.5 wt %, and the amorphous fraction AM has an amount of ethylene- and/or C4 to C12 alpha-olefin-derived comonomer units of 20 to 45 wt %.

32 Claims, No Drawings

HETEROPHASIC POLYMER COMPOSITION OF HIGH STIFFNESS

This application is a National Stage of International Application No. PCT/EP2009/058603, filed Jul. 7, 2009. This application claims priority to European Patent Application No. 08160542.0 filed on Jul. 16, 2008. The disclosures of the above applications are incorporated herein by reference.

The present invention relates to a heterophasic polymer composition of improved stiffness which is useful for the preparation of pipes, and to a process for the preparation of such a heterophasic polymer composition.

Pipes made of polymeric materials are frequently used for various purposes, such as fluid transport, i.e. transport of gases or liquids. The fluid may be pressurised such as when transporting natural gas or tap water, or non-pressurised such as when transporting sewage (wastewater), drainage (land and road drainage), for storm water applications or for indoor soil and waste. Moreover, the transported fluid may have varying temperatures, usually within the temperature range of from about 0° C. to about 50° C. Pressureless (non-pressure) pipes may also be used for cable and pipe protection.

Such non-pressure pipes are herein also referred to as sewage pipes or non-pressure sewage pipes.

The term "pipe" as used herein is meant to comprise pipes in a broader sense, as well as supplementary parts like fittings, valves, chambers and all parts which are commonly necessary for e.g. a sewage piping system. It also comprises single or multilayer pipes, where for example one or more of the layers is a metal layer and which may include an adhesive layer. Structural-wall pipes, such as corrugated pipes, double-wall pipes with or without hollow sections, are also encompassed by the term "pipe".

Different requirements are imposed on pipes for the transport of pressurised fluids (so-called pressure pipes) and pipes for the transport of non-pressurised fluids such as sewage (so-called non-pressure pipes). While pressure pipes must be able to withstand an internal positive pressure, i.e. a pressure inside the pipe that is higher than the pressure outside the pipe, non-pressure pipes do not have to withstand any internal positive pressure, but are instead required to withstand an external positive pressure, i.e. the pressure outside the pipe is higher than the pressure inside the pipe. This higher outside pressure may be due to the earth load on the pipe when submerged in the soil, the groundwater pressure, traffic load, or clamping forces in indoor applications.

Non-pressure pipes such as sewage pipes are made in a variety of dimensions from about 0.1 to about 3 m diameter and of a variety of materials such as ceramics (vitrified clay mainly), concrete, polyvinyl chloride (PVC), polyethylene (PE), and polypropylene (PP). While ceramics and concrete are low-cost materials, they are unfortunately heavy and brittle. There has therefore been a trend during recent years to replace sewage pipes of ceramics or concrete with pipes of polymer materials such as PVC, PE or PP. While PVC costs less than PP per unit weight, PP has advantages over PVC in other respects by having a lower density and thus a lower weight per meter pipe, having superior high and low temperature properties, and being weldable.

Sewage pipes of PP must show sufficient stiffness to withstand the earth load without any help from internal pressure. The stiffness of the pipe is derived primarily from the pipe material and, as a measure of stiffness, the tensile modulus of the pipe material may be taken. The higher the tensile modulus of the pipe material, the stiffer the pipe will be.

Furthermore, non-pressure pipes are often exposed to high as well as low temperatures. They must therefore be durable within a wide range of temperatures which means that they should display high impact strength, particularly at low temperature.

However, as stiffness and impact strength are conflicting properties, it remains difficult to increase tensile modulus of a PP pipe material while still keeping the impact strength on an acceptable level.

WO 99/24479 discloses a nucleated polypropylene composition containing a polymerized vinyl compound. The composition may comprise a propylene homopolymer matrix and an elastomeric ethylene/propylene copolymer dispersed therein. The ethylene content of the amorphous part can be in the range of 30 to 50 wt %. Furthermore, the amount of the dispersed rubber phase can vary in a wide range such as from 5 to 30 wt %, or 10 to 20 wt %. According to the examples, a tensile modulus of at least 2000 MPa could not be realised with heterophasic polymer compositions.

EP 1 026 184 A1 discloses a heterophasic polymer composition comprising a matrix made of a high molecular weight and a low molecular weight PP component, and a dispersed elastomeric phase made of an ethylene/alpha-olefin copolymer. The heterophasic polymer composition can have a xylene cold soluble fraction in an amount of 4 to 30 wt %. The amount of ethylene-derived monomer units in the elastomeric ethylene/alpha-olefin copolymer can be in the range of 22 to 38 wt %. According to the examples, all heterophasic polymer compositions have a flexural modulus of below 2000 MPa.

EP 1 632 529 A1 discloses a heterophasic polymer composition comprising a propylene homopolymer and an elastomeric propylene copolymer dispersed therein. The heterophasic polymer composition has a total amount of comonomer units, e.g. ethylene-derived comonomer units, of at least 2 wt %.

Considering the statements provided above, it is an object of the present invention to provide a polymer composition which is useful for the preparation of a pipe of high stiffness while simultaneously keeping low temperature impact strength on an acceptable level.

According to a first aspect of the present invention, the object outlined above is solved by providing a heterophasic polymer composition, comprising a matrix comprising a propylene homopolymer and/or a propylene copolymer having an amount of comonomer units of less than 1.0 wt %, an elastomeric polypropylene which is dispersed within the matrix and comprises comonomer units derived from ethylene and/or a C4 to C12 alpha-olefin, the heterophasic polymer composition having an amorphous fraction AM in an amount of 2.0 to 7.5 wt %, and the amorphous fraction AM having an amount of ethylene- and/or C4 to C12 alpha-olefin-derived comonomer units of 20 to 45 wt %.

As a first approximation, it can be said that the amount of the amorphous fraction AM corresponds to the amount of elastomeric polymer(s) (i.e. rubber) being present in the heterophasic polymer composition. The amount of the amorphous fraction is easy to measure as described further below in the Examples under the headline "Measuring Methods" and is frequently used as a parameter indicating the amount of elastomeric components within heterophasic, impact-modified compositions.

Another parameter frequently used to determine the amount of elastomeric and/or amorphous components within a polymer composition is the xylene cold soluble fraction XCS (sometimes also referred to as xylene solubles XS). The measuring method is described in further detail below under the headline "Measuring Methods". As a first approximation, the amount of the xylene cold soluble fraction XCS corresponds to the amount of rubber and the amount of those polymer chains of the matrix with low molecular weight and low stereoregularity. Thus, normally the XCS value is slightly higher than the AM value.

Preferably, according to the first aspect of the present invention the heterophasic polymer composition has a xylene cold soluble fraction $XCS_{total}$ in an amount of 3.0 to 8.5 wt %, and/or an amount of ethylene- and/or C4 to C12 alpha-olefin-derived comonomer units of less than 2.0 wt %.

According to a second aspect of the present invention, the object outlined above is solved by providing a heterophasic polymer composition, comprising a matrix comprising a propylene homopolymer and/or a propylene copolymer having an amount of comonomer units of less than 1.0 wt %, an elastomeric polypropylene which is dispersed within the matrix and comprises comonomer units derived from ethylene and/or a C4 to C12 alpha-olefin, the heterophasic polymer composition having a xylene cold soluble fraction $XCS_{total}$ in an amount of 3.0 to 8.5 wt %, and an amount of ethylene- and/or C4 to C12 alpha-olefin-derived comonomer units of less than 2.0 wt %.

Preferably, the heterophasic polymer composition according to the second aspect of the present invention has an amorphous fraction AM in an amount of 2.0 to 7.5 wt %, and/or the amorphous fraction AM has an amount of ethylene- and/or C4 to C12 alpha-olefin-derived comonomer units of 20 to 45 wt %.

If not indicated otherwise, the following statements apply to the first aspect as well as to the second aspect of the present invention.

In the present invention, the term "matrix" is to be interpreted in its commonly accepted meaning, i.e. it refers to a continuous phase (in the present invention a continuous polymer phase) in which isolated or discrete particles such as rubber particles may be dispersed.

The matrix phase can be made of the propylene homo- and/or copolymer only but can also comprise additional polymers, in particular polymers which can be blended homogeneously with the propylene homo- or copolymer and together form a continuous phase which can act as a matrix. In a preferred embodiment, at least 80 wt % of the matrix, more preferably at least 90 wt %, even more preferably at least 95 wt % of the matrix are made of the propylene homo- and/or copolymer. Even further preferred, the matrix consists of the propylene homo- and/or copolymer.

In a preferred embodiment, the matrix only comprises the propylene homopolymer but does not comprise the propylene copolymer.

If present in the matrix, the propylene copolymer includes comonomer units derived from ethylene, C4 to C12 alpha-olefins, or any mixture thereof. As indicated above, the propylene copolymer has an amount of comonomer units of less than 1.0 wt %, preferably less than 0.75 wt %, more preferably less than 0.5 wt %.

Preferably, the propylene homopolymer and/or the propylene copolymer of the matrix has/have an MFR (230° C., 2.16 kg) within the range of 0.1 g/10 min to 1.5 g/10 min, more preferably 0.2 g/10 min to 1.0 g/10 min, even more preferably 0.2 g/10 min to 0.5 g/10 min.

As indicated above, in addition to the propylene homo- and/or copolymer the matrix may optionally comprise further polymer(s) which can be blended homogeneously with the propylene homo and/or copolymer. Preferably, the matrix, either consisting of the propylene homo- and/or copolymer or optionally comprising one or more additional polymers, has an MFR (2.16 kg, 230° C.) within the range of 0.1 g/10 min to 1.5 g/10 min, more preferably 0.2 g/10 min to 1.0 g/10 min, even more preferably 0.2 g/10 min to 0.5 g/10 min.

Of course, if the matrix consists of the propylene homo- or copolymer, preferably of the propylene homopolymer, the MFR value of the matrix corresponds to the MFR value of the polymer.

The propylene homo- or copolymer constituting the matrix can be either unimodal or multimodal such as bimodal. As used herein, the term "multimodal" is intended to cover polymers having at least two differently centred maxima along the x-axis of their molecular weight distribution curve as determined by gel permeation chromatography. In such a curve d(log(MW)) is plotted as ordinate against log (MW), where MW is molecular weight.

Preferably, the high molecular weight fraction of the multimodal, preferably bimodal propylene homo- or copolymer of the matrix has an MFR (230° C., 10.0 kg) within the range of 0.1 g/10 min to 2.5 g/10 min, more preferably 0.5 g/10 min to 1.5 g/10 min, even more preferably 0.7 g/10 min to 1.5 g/10 min.

Preferably, the propylene homo- and/or copolymer of the matrix has/have a xylene cold soluble fraction $XCS_{PPmatrix}$ in an amount of less than 3.0 wt %, more preferably less than 2.0 wt %, even more preferably less than 1.5 wt %.

As indicated above, in addition to the propylene homo- and/or copolymer the matrix may optionally comprise further polymer(s) which can be blended homogeneously with the propylene homo- and/or copolymer. Preferably, the matrix, either consisting of the propylene homo- and/or copolymer or optionally comprising one or more additional polymers, has a xylene cold soluble fraction $XCS_{matrix}$ in an amount of less than 3.0 wt %, more preferably less than 2.0 wt %, even more preferably less than 1.5 wt %.

Of course, if the matrix consists of the propylene homo- or copolymer, preferably of the propylene homopolymer, as defined above, $XCS_{PPmatrix}$ and $XCS_{matrix}$ are identical. In case the matrix includes one or more additional polymers, which are homogeneously blended with the propylene homo- or copolymer as defined above, $XCS_{PPmatrix}$ and $XCS_{matrix}$ might slightly differ.

As indicated above, the heterophasic polymer composition further comprises an elastomeric polypropylene copolymer which is dispersed in the matrix and comprises comonomer units derived from ethylene and/or a C4 to C12 alpha-olefin.

Within the present invention, it is possible that, in addition to the elastomeric polypropylene as defined above and in further detail below, the heterophasic polymer composition may comprise further elastomeric polymer components. However, it is preferred that the elastomeric polypropylene represents at least 80 wt %, more preferably at least 90 wt %, even more preferably at least 95 wt % of the total rubber content in the heterophasic polymer composition. In a preferred embodiment, the elastomeric polypropylene is the only elastomeric polymer which is present in the heterophasic polymer composition.

Preferably, the elastomeric polypropylene copolymer comprises ethylene-derived and/or C4 to C12 alpha-olefin derived comonomer units, more preferably only ethylene-derived comonomer units. Preferably, these comonomer units are present in an amount of 20 wt % to 45 wt %, more preferably 22 wt % to 35 wt %, based on the weight of the elastomeric polypropylene.

In case the elastomeric polypropylene comprises comonomer units derived from a C4 to C12 alpha-olefin, these are preferably selected from 1-butene, 1-hexene, 1-octene, or any mixture thereof.

As indicated above, the heterophasic polymer composition according to the first aspect of the present invention has an amorphous fraction AM in an amount of 2.0 to 7.5 wt %, and the amorphous fraction AM has an amount of ethylene- and/or C4 to C12 alpha-olefin-derived comonomer units of 20-45 wt %

Preferably, the heterophasic polymer composition has an amorphous fraction AM in an amount of 3.0 wt % to 7.5 wt %, more preferably 3.0 wt % to 6.0 wt %. These preferred values apply to the heterophasic polymer composition according to the first and second aspect of the present invention.

Preferably, the amount of the ethylene- and/or C4 to C12 alpha-olefin-derived comonomer units, more preferably the amount of ethylene-derived comonomer units in the amorphous fraction AM of the heterophasic polymer composition is from 22 wt % to 35 wt %, more preferably from 23 wt % to 32 wt %. These preferred values apply to the heterophasic polymer composition according to the first and second aspect of the present invention.

Preferably, the elastomeric polypropylene represents at least 60 wt %, more preferably at least 65 wt %, even more preferably at least 70 wt % of the amorphous fraction AM of the heterophasic polymer composition.

As indicated above with respect to the second aspect of the present invention, the heterophasic polymer composition has a xylene cold soluble fraction $XCS_{total}$ in an amount of 3.0 to 8.5 wt %, and an amount of ethylene- and/or C4 to C12 alpha-olefin-derived comonomer units of less than 2.0 wt %.

Preferably, the heterophasic polymer composition has a xylene cold soluble fraction $XCS_{total}$ in an amount of 3.0 to 7.0 wt %, more preferably 4.0 to 7.0 wt %. These preferred values apply to the heterophasic polymer composition according to the first and second aspect of the present invention.

Preferably, the heterophasic polymer composition has an amount of ethylene- and/or C4 to C12 alpha-olefin-derived comonomer units of less than 1.8 wt %, With respect to the lower limit, it is preferred that the heterophasic polymer composition has an amount of ethylene- and/or C4 to C12 alpha-olefin-derived comonomer units of at least 0.8 wt %, more preferably at least 1.0 wt %. These preferred values apply to the heterophasic polymer composition according to the first and second aspect of the present invention.

Preferably, the elastomeric polypropylene represents at least 60 wt %, more preferably at least 65 wt % of the xylene cold soluble fraction $XCS_{total}$ of the heterophasic polymer composition.

Preferably, the amorphous fraction AM of the heterophasic polymer composition has an intrinsic viscosity within the range of 2.0 dl/g to 5.0 dl/g, more preferably 2.5 dl/g to 5.0 dl/g, even more preferably 3.0 dl/g to 4.5 dl/g.

The polymer composition may include 0.05-3 wt % of one or more nucleating agents, such as talc, polymerized vinyl compounds such as polyvinyl cyclohexane (poly-VCH), dibenzylidene sorbitol (DBS), sodium benzoate, and di(alkylbenzylidene)sorbitol. Except for talc, the nucleating agents are usually added in small amounts of 0.0001-1% by weight, preferably 0.001-0.7% by weight. Talc is a specific case as it may be added both as a nucleating agent and as a filler. When added as a nucleating agent talc is added in an amount of 0.05-3% by weight, preferably 0.1-2% by weight.

Preferably, the heterophasic polymer composition has a tensile modulus, measured according to ISO 527-2/1B at 1 mm/min and 23° C., of more than 1800 MPa.

According to another aspect, the present invention provides a pipe, comprising the heterophasic polymer composition as defined above.

Preferably, the pipe is a non-pressure pipe such as a non-pressure sewage pipe. In other words, the pipe of the present invention is preferably used for the transport of non-pressurized fluids such as sewage.

Preferably, the pipe has a tensile modulus of more than 1900 MPa, more preferably more than 2000, even more preferably more than 2100 MPa, wherein the tensile modulus is determined by the following formula:

$$\text{tensile modulus} = RS \times 12 \times [(D-t)/t]^3$$

wherein
RS is ring stiffness, determined according to EN ISO 9969,
D is the outer diameter of the pipe in mm, and
t is the wall thickness of the pipe in mm.

Impact strength of a pipe can be determined by the so-called resistance to external blows which is measured according to EN 1411. The measurement provides a H50 value for a pipe, which is the height where 50% of the samples fail.

Preferably, the pipe of the present invention has an H50 value of at least 1100 mm, more preferably at least 1500 mm, even more preferably at least 2000 mm.

In general, the pipe can be manufactured by extrusion or injection moulding. Preferably, it is prepared by extrusion. A conventional plant for screw extrusion of polymer pipes comprises a single or double screw extruder, a nozzle, a calibrating device, cooling equipment, a pulling device, and a device for cutting or for coiling-up the pipe. The polymer is extruded into a pipe from the extruder.

According to a further aspect, the present invention provides a process for the preparation of the heterophasic polymer composition as defined above, comprising the following steps:
(i) preparing the propylene homo- or copolymer as defined above in at least one loop reactor and optionally in at least one gas phase reactor, and
(ii) transferring the propylene homo- or copolymer to at least one gas phase reactor and preparing the elastomeric polypropylene as defined above in the presence of the propylene homo- or copolymer.

Preferably, the temperature of the loop reactor is at least 80° C. and the pressure is at least 4600-10000 kPa.

In a preferred embodiment, step (i) comprises a loop and a gas-phase reactor in a cascade. Preferably, the loop reactor operates in liquid propylene and at a high polymerization temperature of at least 80° C., most preferably at supercritical temperature and pressure conditions.

The term "supercritical" conditions means that both the temperature and the pressure in the reactor are above the corresponding supercritical temperature and pressure of the reaction medium. For a reaction medium of propylene this means a temperature of at least 92° C. and a pressure of at least 4600 kPa. Preferred temperatures are in the range of 92-110° C. Preferred pressures are in the range 4600-10000 kPa, more preferably 5000-7000 kPa.

If step (i) comprises a gas-phase reactor, it is preferably operated at a temperature of 50-115° C., more preferably 60-110° C., even more preferably 80-105° C. and a pressure of 500-5000 kPa, more preferably 1500-3500 kPa. Preferably, when the loop polymerization step of step (i) is carried out at surpercritical conditions, the temperature of the gas-phase reactor is 85-95° C. and the pressure is 2000-3000 kPa.

The production ratio by weight (the so-called "split") between the loop reactor and the gas-phase reactor of step (i) may be from 20:80 to 80:20, more preferably 30:70 to 70:30, even more preferably 40:60 to 60:40.

The gas-phase reactor(s) of step (i), if used, may be any ordinary fluidised bed reactor, although other types of gas-phase reactors can be used.

After having prepared in step (i) the propylene homo- or copolymer constituting the matrix, the product of step (i) is transferred to a gas phase reactor where the elastomeric polypropylene is prepared in the presence of the propylene homo- or copolymer and in situ dispersed therein (so-called "reactor blending"). Optionally, step (ii) may comprise one or more additional gas phase reactors provided in serial configuration.

As a catalyst for the polymerization in step (i) and/or step (ii), any stereospecific catalyst for propylene polymerization can be used, which is capable of catalysing polymerization and copolymerization of propylene and comonomers, preferably at a pressure of 500-10000 kPa, in particular 2500-8000 kPa, and at a temperature of 40-110° C., in particular 60-110° C. Preferably, the catalyst comprises a Ziegler-Natta-type catalyst which can be used at high polymerization temperatures of 80° C. or more.

Generally, the Ziegler-Natta catalyst used in the present invention comprises a catalyst component, a cocatalyst component, an external donor, the catalyst component of the catalyst system primarily containing magnesium, titanium, halogen and an internal donor. Electron donors control the stereospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferred to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereoselectivity. This low polymerization temperature may put a practical limit on the heat removal efficiency of the loop reactor.

One preferred catalyst to be used according to the invention is disclosed in EP 0 591 224 which discloses a method for preparing a procatalyst composition from magnesium dichloride, a titanium compound, a lower alcohol and an ester of phthalic acid containing at least five carbon atoms. According to EP 0 591 224, a transesterification reaction is carried out at an elevated temperature between the lower alcohol and the phthalic acid ester, whereby the ester groups from the lower alcohol and the phthalic ester change places.

Magnesium dichloride can be used as such or it can be combined with silica, e.g. by absorbing the silica with a solution or slurry containing magnesium dichloride. The lower alcohol used may preferably be methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the phthalic acid ester used comprises at least five carbon atoms, preferably at least eight carbon atoms. Propylhexyl phthalate, dioctyl phthalate, diisodecyl phthalate and ditridecyl phthalate may be used. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferred to carry out the transesterification at a temperature which is 110-150° C., preferably 120-140° C.

The catalyst can also be modified as described in EP 1 028 985.

The catalyst prepared by the method above is used together with an organometallic cocatalyst and with an external donor. Generally, the external donor has the formula

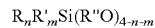

$$R_nR'_mSi(R''O)_{4-n-m}$$

wherein
R and R' can be the same or different and represent a linear, branched or cyclic aliphatic, or aromatic group; R" is methyl or ethyl;
n is an integer of 0 to 3;
M is an integer of 0 to 3; and
n+m is 1 to 3.

In particular, the external donor is selected from the group consisting of cyclohexyl methylmethoxysilane (CHMMS), dicyclopentyl dimethoxysilane (DCPDMS), diisopropyl dimethoxysilane, di-isobutyl dimethoxysilane, and di-t-butyl dimethoxysilane.

An organoaluminium compound is used as a cocatalyst. The organoaluminium compound is preferably selected from the group consisting of trialkyl aluminium, dialkyl aluminium chloride and alkyl aluminium sesquichloride.

In a preferred embodiment, step (ii) is carried out in the presence of a compound selected from a glycerol ester, an ethoxylated amine, an ethoxylated amide, carbon monoxide, or any combination thereof.

As these compounds may decrease catalyst activity, they can be used to lower the amount of rubber produced in step (ii).

As an example, reference can be made to Grindsted PS 432 from Danisco, which is a glycerol ester compound.

The present invention will now be described in further detail by making reference to the examples provided below.

EXAMPLES

I. Measuring Methods

1. Melt Flow Rate MFR
   Melt flow rate was measured according to ISO 1133, either at 230° C. and 2.16 kg (MFR2.16 kg/230° C.) or at 230° C. and 10 kg (MFR10 kg/230° C.).
2. Intrinsic Viscosity IV
   The intrinsic viscosity of the amorphous fraction was measured according to ISO 1628 in decahydronaphtalene (decalin) at 135° C.

3. Tensile Modulus

3.1 Tensile Modulus Measured on Injection Moulded Samples

Tensile modulus was determined according to ISO 527-2/1 B at 1 mm/min. and 23° C. To determine stress at yield and strain at yield, a speed of 50 mm/min. was used. Tensile modulus was determined on 4 mm thick test specimens according to ISO 527-2/1B. The injection moulded test specimens are made in a positive mould according to ISO 1873-2, multipurpose specimen.

3.2 Tensile Modulus Measured on an Extruded Pipe

The tensile modulus was determined by using the following formula:

$$\text{tensile modulus} = RS \times 12 \times [(D-t)/t]^3$$

wherein
RS is ring stiffness, determined according to EN ISO 9969,
D is the outer diameter of the pipe in mm, and
t is the wall thickness of the pipe in mm.

4. Ring Stiffness

Ring stiffness is determined according to EN 9969 on pipes having a diameter of 110 mm and a wall thickness of about 4 mm (exact values in the table) at 23° C.

5. Resistance to External Blows by Stair Case Method, H50 Value

The so-called resistance to external blows was determined according to EN 1411. The H50 value for a pipe is the height where 50% of the samples fail. The outer diameter for the pipes was 110 mm and the wall thickness 4 mm. The striker was 8 kg, type D 90, and the tests were made at −10° C.

6. Charpy Notched Impact Strength

Charpy impact strength was determined according to ISO 179/1eA on injection molded test specimens made according to ISO 1873. The dimension of the test specimen was 80×10×4 mm.

7. Xylene Cold Soluble Fraction XCS, Amorphous Fraction AM

XCS and AM were determined as follows:
2.0 g of polymer was dissolved in 250 ml p-xylene at 135° C. under agitation. After 30±2 minutes the solution was allowed to cool for 15 minutes at ambient temperature and then allowed to settle for 30 minutes at 25±0.5° C. The solution was filtered with filter paper into two 100 ml flasks.

The solution from the first 100 ml vessel was evaporated in nitrogen flow and the residue dried under vacuum at 90° C. until constant weight is reached.

$$XS\% = (100 \times m1 \times v0)/(m0 \times v1), \text{ wherein}$$

m0=initial polymer amount (g)
m1=weight of residue (g)
v0=initial volume (ml)
v1=volume of analyzed sample (ml)

The amorphous content (AM) is measured by separating the above xylene cold soluble fraction and precipitating the amorphous part with acetone. The precipitate was filtered and dried in a vacuum oven at 90° C.

$$AM\% = (100 \times m1 \times v0)/(m0 \times v1), \text{ wherein}$$

m0=initial polymer amount (g)
m1=weight of precipitate (g)
v0=initial volume (ml)
v1=volume of analyzed sample (ml)

8. Comonomer Content

Measurement of the comonomer content (wt %) was based on Fourier transform infrared spectroscopy (FTIR) determination calibrated with $^{13}$C-NMR.

II. Examples E1-E2 and CE1-CE2

E1 and E2 are inventive examples whereas CE1 and CE2 are comparative examples.

In all examples, the propylene polymers were prepared in the presence of a Ziegler-Natta catalyst which had been prepared according to Example 2 of WO 00/68315.

In Examples E1-E2 and CE1-CE2, the matrix is made of a propylene homopolymer which was prepared in a loop reactor and a gas phase reactor (GPR1). Further information about the propylene homopolymer constituting the matrix is shown in Table 1.

Subsequently, the propylene homopolymer was transferred to a second gas phase reactor (GPR2) where the elastomeric polypropylene was prepared. In E1 and E2, Grindsted PS 432 (a glycerol ester compound) was added to the second gas phase reactor at a feed rate of 3.3 g/h.

Further information about the process parameters is provided in Table 1.

In all examples, the final polymer composition also included phenolic antioxidants, process stabilisers, and talc.

Further information about the properties of the final heterophasic polymer composition is provided in Table 2.

The polymers were extruded into solid wall non-pressure sewage pipes in the following way:
External diameter: 110 mm
Wall thickness: 3.9 mm (examples E1 and E2), 4.4 mm (comparative examples CE1 and CE2)
Extruder: Conventional screw extruder, diameter 60 mm, length 36D
Temperature profile: 200° C./210° C./210° C./210° C./210° C.
Line speed: 1 m/min
Calibration and cooling: conventional methods
Table 2 also shows tensile modulus and H50 values as measured on the extruded pipe.

TABLE 1

| Process parameters | | | | |
|---|---|---|---|---|
| | E1 | E2 | CE1 | CE2 |
| Catalyst feed (g/h) | 5.0 | 5.2 | | |
| Ti content % | 1.9 | 1.9 | | |
| Donor feed (g/t propylene) | 80 | 80 | | |
| Al/Ti ratio (mol/mol) | 127 | 122 | | |
| Al/donor ratio (mol/mol) | 5.0 | 5.0 | | |
| Prepolymerisation | | | | |
| Temperature (° C.) | 40 | 40 | 30 | 30 |
| Hydrogen feed (g/h) | 0.5 | 0.5 | | |
| Loop reactor | | | | |
| Temperature (° C.) | 85 | 85 | 85 | 85 |
| Pressure (kPa) | 5462 | 5471 | 5500 | 5500 |
| H2/C3 ratio (mol/kmol) | 0.07 | 0.08 | | |
| MFR10 (g/10 min) | 1.1 | 1.3 | 0.8 | 0.8 |
| Gas phase reactor 1 | | | | |
| Temperature (° C.) | 95 | 95 | 90 | 90 |
| Pressure (kPa) | 2301 | 2300 | 2500 | 2500 |
| H2/C3 ratio (mol/kmol) | 214 | 214 | | |
| MFR2 (g/10 min) | 0.33 | 0.29 | 0.3 | 0.3 |
| Gas phase reactor 2 | | | | |
| Temperature (° C.) | 60 | 60 | 70 | 80 |
| Pressure (kPa) | 2000 | 2000 | 2000 | 2000 |
| C2/C3 ratio (mol/kmol) | 700 | 700 | 550 | 550 |
| H2/C2 ratio (mol/kmol) | 14 | 22 | | |
| Additive feed (g/h) catalyst posion | 3.3 | 3.3 | | |

TABLE 2

Properties of the materials according to E1-E2 and CE1-CE2

|  | E1 | E2 | CE1 | CE2 |
|---|---|---|---|---|
| MFR2 (g/10 min) | 0.31 | 0.3 | 0.25 | 0.25 |
| Intrinsic Viscosity(dl/g)) | 4.12 | 4.06 | 3.5 | 3.5 |
| XS (w %) | 5.2 | 5.6 | 9 | 11 |
| Ethene content (%) | 1.6 | 1.7 | 3.7 | 5.1 |
| AM (w %) | 4.2 | 4.5 | 8 | 12 |
| Ethene of AM (%) | 29 | 26 | 34 | 33 |
| Intrinsic Viscosity of AM (dl/g) | 4.3 | 3.9 | 3.6 | 3.5 |
| Stress at yield (MPa) | 38.3 | 37.4 | 33.1 | 31.9 |
| Strain at yield (%) | 6.5 | 6.6 | 7.7 | 8.5 |
| Strain at break (%) | 130 | 150 | 58 | 58 |
| Tensile modulus (MPa) | 2040 | 2010 | 1778 | 1685 |
| Charpy notched, 0° C. (kJ/m2) | 4.1 | 5.3 | 6.7 | 14 |
| Pipe properties |  |  |  |  |
| Ringstiffness (N/m2) | 9169 | 9197 | 11260 | 10590 |
| Tensile modulus (MPa) | 2228 | 2156 | 1812 | 1707 |
| Mean wall thickness, mm | 3.9 | 3.95 | 4.4 | 4.4 |
| Resistance to external blows, H50 (mm), −10° C. | 1625 | 2393 | >4000 | >4000 |

As can be seen from the Table, samples E1 and E2 have an amorphous fraction AM and an ethylene content within the amorphous fraction AM in amounts which are within the ranges as defined above and in the claims. Furthermore, E1 and E2 have an XCS fraction and a total ethylene content within the ranges as defined above and in the claims. As a consequence, a tensile modulus clearly exceeding 2000 MPa could be realized. Furthermore, impact strength of the extruded pipe, expressed as H50 value, could still be maintained on an acceptable level.

The samples according to comparative examples CE1 and CE2 did not comply with these ranges and had tensile modulus values clearly below 2000 MPa.

We claim:

1. A heterophasic polymer composition, comprising
   a matrix comprising a propylene homopolymer and/or a propylene copolymer having an amount of comonomer units of less than 1.0 wt %,
   an elastomeric polypropylene which is dispersed within the matrix and comprises comonomer units derived from ethylene and/or a C4 to C12 alpha-olefin,
   the heterophasic polymer composition having an amorphous fraction AM in an amount of 2.0 to 7.5 wt %, and the amorphous fraction AM having an amount of ethylene- and/or C4 to C12 alpha-olefin-derived comonomer units of 20 to 45 wt %, the heterophasic polymer composition having an amount of ethylene- and/or C4 to C12 alpha-olefin-derived comonomer units of from 0.8 wt % to less than 1.8 wt %.

2. The heterophasic polymer composition according to claim 1, having a xylene cold soluble fraction $XCS_{total}$ in an amount of 3.0 to 8.5 wt %.

3. A heterophasic polymer composition, comprising
   a matrix comprising a propylene homopolymer and/or a propylene copolymer having an amount of comonomer units of less than 1.0 wt %,
   an elastomeric polypropylene which is dispersed within the matrix and comprises comonomer units derived from ethylene and/or a C4 to C12 alpha-olefin,
   the heterophasic polymer composition having a xylene cold soluble fraction $XCS_{total}$ in an amount of 3.0 to 8.5 wt %, and an amount of ethylene- and/or C4 to C12 alpha-olefin-derived comonomer units of from 0.8 wt % to less than 1.8 wt %.

4. The heterophasic polymer composition according to claim 3, having an amorphous fraction AM in an amount of 2.0 to 7.5 wt %, and the amorphous fraction AM having an amount of ethylene- and/or C4 to C12 alpha-olefin-derived comonomer units of 20 to 45 wt %.

5. The heterophasic polymer composition according to claim 3, wherein at least 80 wt % of the matrix are made of the propylene homopolymer.

6. The heterophasic polymer composition according to claim 3, wherein the matrix has an MFR (230° C., 2.16 kg) within the range of 0.1 g/10 min to 1.5 g/10 min.

7. The heterophasic polymer composition according to claim 1, wherein the matrix has a xylene cold soluble fraction $XCS_{matrix}$ in an amount of less than 3.0 wt %.

8. The heterophasic polymer composition according to claim 1, wherein the amount of the amorphous fraction AM in the heterophasic polymer composition is from 3.0 wt % to 7.5 wt %.

9. The heterophasic polymer composition according to claim 1, wherein the amount of ethylene-derived comonomer units in the amorphous fraction AM of the heterophasic polymer composition is from 22 wt % to 35 wt %.

10. The heterophasic polymer composition according to claim 1, wherein the elastomeric polypropylene represents at least 60 wt % of the amorphous fraction AM of the heterophasic polymer composition.

11. The heterophasic polymer composition according to claim 3, wherein the amount of the xylene cold soluble fraction $XCS_{total}$ in the heterophasic polymer composition is from 3.0 wt % to 7.0 wt %.

12. The heterophasic polymer composition according to claim 3, wherein the elastomeric polypropylene represents at least 60 wt % of the xylene cold soluble fraction $XCS_{total}$ of the heterophasic polymer composition.

13. The heterophasic polymer composition according to claim 1, wherein the amorphous fraction AM of the heterophasic polymer composition has an intrinsic viscosity within the range of 2.0 dl/g to 5.0 dl/g.

14. A pipe, comprising a heterophasic polymer composition comprising
   a matrix comprising a propylene homopolymer and/or a propylene copolymer having an amount of comonomer units of less than 1.0 wt %,
   an elastomeric polypropylene which is dispersed within the matrix and comprises comonomer units derived from ethylene and/or a C4 to C12 alpha-olefin,
   the heterophasic polymer composition having an amorphous fraction AM in an amount of 2.0 to 7.5 wt %, and the amorphous fraction AM having an amount of ethylene- and/or C4 to C12 alpha-olefin-derived comonomer units of 20 to 45 wt %, the heterophasic polymer composition having an amount of ethylene- and/or C4 to C12 alpha-olefin-derived comonomer units of from 0.8 wt % to less than 1.8 wt %.

15. The pipe according to claim 14, having a tensile modulus of more than 1900 MPa, the tensile modulus being determined by the following formula:

$$\text{tensile modulus} = RS \times 12 \times [(D-t)/t]^3$$

wherein
RS is ring stiffness, determined according to EN ISO 9969,
D is the outer diameter of the pipe in mm, and
t is the wall thickness of the pipe in mm.

16. The pipe according to claim 14, having a H50 value, determined according to EN 1411 at −10° C., of at least 1100 mm.

17. A process for the preparation of a heterophasic polymer composition, comprising the following steps:

(i) preparing a propylene homo- or copolymer in at least one loop reactor and optionally in at least one gas phase reactor, (ii) transferring the propylene homo- or copolymer to at least one gas phase reactor and preparing an elastomeric polypropylene in the presence of the propylene homo- or copolymer, the propylene homo- or copolymer having an amount of comonomer units of less than 1.0 wt %, the elastomeric polypropylene having comonomer units derived from ethylene and/or a C4 to C12 alpha-olefin, and the heterophasic polymer composition having an amorphous fraction AM in an amount of 2.0 to 7.5 wt %, and the amorphous fraction AM having an amount of ethylene- and/or C4 to C12 alpha-olefin-derived comonomer units of 20 to 45 wt %, the heterophasic polymer composition having an amount of ethylene- and/or C4 to C12 alpha-olefin-derived comonomer units of from 0.8 wt % to less than 1.8 wt %.

18. The process according to claim 17, wherein steps (i) and (ii) are carried out in the presence of a Ziegler-Natta catalyst.

19. The process according to claim 17, wherein step (ii) is carried out in the presence of a compound selected from the group consisting of a glycerol ester, an ethoxylated amine, an ethoxylated amide, carbon monoxide, and any combination thereof.

20. The heterophasic polymer composition according to claim 3, wherein at least 90 wt % of the matrix are made of the propylene homopolymer.

21. The heterophasic polymer composition according to claim 1, wherein the matrix has a xylene cold soluble fraction $XCS_{matrix}$ in an amount of less than 2.0 wt %.

22. The heterophasic polymer composition according to claim 1, wherein the matrix has a xylene cold soluble fraction $XCS_{matrix}$ in an amount of less than 1.5 wt %.

23. The heterophasic polymer composition according to claim 1, wherein the amount of the amorphous fraction AM in the heterophasic polymer composition is from 3.0 wt % to 6.0 wt %.

24. The heterophasic polymer composition according to claim 1, wherein the amount of ethylene-derived comonomer units in the amorphous fraction AM of the heterophasic polymer composition is from 23 wt % to 32 wt %.

25. The heterophasic polymer composition according to claim 1, wherein the elastomeric polypropylene represents at least 65 wt % of the amorphous fraction AM of the heterophasic polymer composition.

26. The heterophasic polymer composition according to claim 3, wherein the amount of the xylene cold soluble fraction $XCS_{total}$ in the heterophasic polymer composition is from 4.0 wt % to 7.0 wt %.

27. The heterophasic polymer composition according to claim 3, wherein the elastomeric polypropylene represents at least 65 wt % of the xylene cold soluble fraction $XCS_{total}$ of the heterophasic polymer composition.

28. The heterophasic polymer composition according to claim 1, wherein the amorphous fraction AM of the heterophasic polymer composition has an intrinsic viscosity within the range of 2.5 dl/g to 5.0 dl/g.

29. The heterophasic polymer composition according to claim 1, wherein the amorphous fraction AM of the heterophasic polymer composition has an intrinsic viscosity within the range of 3.0 dl/g to 4.5 dl/g.

30. The pipe according to claim 14, having a tensile modulus of more than 2000 MPa, the tensile modulus being determined by the following formula:

$$\text{tensile modulus} = RS \times 12 \times [(D-t/t)]^3$$

wherein

RS is ring stiffness, determined according to EN ISO 9969,

D is the outer diameter of the pipe in mm, and t is the wall thickness of the pipe in mm.

31. The pipe according to claim 14, having a H50 value, determined according to EN 1411 at −10° C., of at least 1500 mm.

32. The pipe according to claim 14, having a H50 value, determined according to EN 1411 at −10° C., of at least 2000 mm.

* * * * *

UNITED STATES PATENT AND TRADEMARK OFFICE
CERTIFICATE OF CORRECTION

PATENT NO. : 8,568,845 B2  
APPLICATION NO. : 12/737463  
DATED : October 29, 2013  
INVENTOR(S) : Malm et al.

Page 1 of 1

It is certified that error appears in the above-identified patent and that said Letters Patent is hereby corrected as shown below:

In the Specification:

Column 6, Line 66, "surpercritical" should be -- supercritical --;

Column 11, Line 7, "Intrinsic Viscosity(dl/g))" should be -- Intrinsic Viscosity(dl/g) --; and In the Claims:

Column 14, Line 29, Claim 30 "tensile modulus=RS×12×[(D-t/t]3" should be
-- tensile modulus=RS×12×[(D-t)/t]3 --.

Signed and Sealed this
Nineteenth Day of August, 2014

Michelle K. Lee
*Deputy Director of the United States Patent and Trademark Office*